US012092311B2

(12) United States Patent
Dickie

(10) Patent No.: US 12,092,311 B2
(45) Date of Patent: Sep. 17, 2024

(54) WEARABLE ILLUMINATION DEVICES AND ILLUMINATING ZIPPER PULLS

(71) Applicant: Brightz, Ltd., Ottawa Lake, MI (US)

(72) Inventor: Samantha Dickie, Canton, MI (US)

(73) Assignee: BRIGHTZ, LTD., Ottawa Lake, MI (US)

( * ) Notice: Subject to any disclaimer, the term of this patent is extended or adjusted under 35 U.S.C. 154(b) by 17 days.

(21) Appl. No.: 18/206,952

(22) Filed: Jun. 7, 2023

(65) Prior Publication Data

US 2023/0392781 A1 Dec. 7, 2023

Related U.S. Application Data

(60) Provisional application No. 63/349,785, filed on Jun. 7, 2022.

(51) Int. Cl.

| | |
|---|---|
| ***F21V 33/00*** | (2006.01) |
| ***A44B 19/26*** | (2006.01) |
| ***F21S 9/02*** | (2006.01) |
| ***F21V 15/01*** | (2006.01) |
| ***F21V 17/10*** | (2006.01) |
| ***F21V 21/008*** | (2006.01) |
| ***F21V 23/04*** | (2006.01) |
| ***F21Y 113/13*** | (2016.01) |
| ***F21Y 115/10*** | (2016.01) |

(52) U.S. Cl.

CPC ........ *F21V 33/0008* (2013.01); *A44B 19/262* (2013.01); *F21S 9/02* (2013.01); *F21V 15/012* (2013.01); *F21V 17/107* (2013.01); *F21V 21/008* (2013.01); *F21V 23/04* (2013.01); *F21Y 2113/13* (2016.08); *F21Y 2115/10* (2016.08)

(58) Field of Classification Search

CPC .. F21V 33/0008; F21V 15/012; F21V 17/107; F21V 21/008; A44B 19/262; F21S 9/02; F21Y 2115/10; A44C 15/0015

See application file for complete search history.

(56) References Cited

U.S. PATENT DOCUMENTS

| | | | | |
|---|---|---|---|---|
| 5,530,432 A * | 6/1996 | Chen | A44C 15/0015 356/221 |
| 8,240,868 B1 * | 8/2012 | Sims | A44C 15/0015 362/108 |
| 9,412,249 B2 * | 8/2016 | Smith | A44C 15/00 |

(Continued)

*Primary Examiner* — Abdulmajeed Aziz
*Assistant Examiner* — Jessica M Apenteng
(74) *Attorney, Agent, or Firm* — Dinsmore & Shohl LLP

(57) ABSTRACT

An illumination device having comprising a first housing portion connected a second housing portion by a hinge at a first end, when folded about the hinge the first housing portion and the second housing portion mate and form an enclosure therein; a tongue formed on an end of the first housing portion opposite the hinge; a groove formed on an end of the second housing portion opposing the hinge, a first hole extending through the tongue, a second hole extending through a first portion of the two portions of the groove and a third hole extending through a second portion of the two portions of the groove, wherein the holes are axially aligned; a coupling portion comprising a flexible string-like material extends through each of the first hole, the second hole, and the third hole; and an illumination source powered by a power source and controlled by a switch.

20 Claims, 7 Drawing Sheets

(56) References Cited

U.S. PATENT DOCUMENTS

| | | | | |
|---|---|---|---|---|
| 2006/0117794 | A1* | 6/2006 | Solomon | A44C 15/0015 63/1.13 |
| 2007/0107652 | A1* | 5/2007 | Michida | A44B 19/262 343/712 |
| 2017/0317705 | A1* | 11/2017 | Duneier | G06F 1/1637 |

* cited by examiner

WEARABLE ILLUMINATION DEVICES AND ILLUMINATING ZIPPER PULLS

CROSS-REFERENCE TO RELATED APPLICATION

This application claims priority to U.S. Provisional Application No. 63/349,785 filed Jun. 7, 2022, the disclosure of which is incorporated herein by reference in its entirety.

TECHNICAL FIELD

The present specification relates to illumination devices, and more specifically to wearable illumination devices that are capable of being connected to a pull or slider of a zipper.

BACKGROUND

Illumination devices function as sources of illumination for an area of an environment and/or can attached to an object and operate as an identifier of the object. For example, an illumination device attached to an object can help a user seek and interact the object in an otherwise low illumination environment.

SUMMARY

In one embodiment, an illumination device comprising an illumination portion comprising: a first housing portion connected a second housing portion by a hinge at a first end, wherein when folded about the hinge the first housing portion and the second housing portion mate and form an enclosure therein; a tongue formed on an end of the first housing portion opposite the hinge; a groove formed on an end of the second housing portion opposing the hinge, the groove comprising two portions spaced apart to receive the tongue; a first hole extending through the tongue, a second hole extending through a first portion of the two portions of the groove and a third hole extending through a second portion of the two portions of the groove, wherein the first hole, the second hole, and the third hole are axially aligned when the first housing portion and the second housing portion are mated; a coupling portion comprising a flexible string-like material extends through each of the first hole, the second hole, and the third hole; and an illumination source powered by a power source and controlled by a switch, the illumination source, the power source, and the switch are disposed within the enclosure, wherein the switch is actuatable by compressing the first housing portion and the second housing portion.

In another embodiment, an illumination device comprising an illumination portion comprising: a first housing portion connected a second housing portion by a hinge at a first end, wherein when folded about the hinge the first housing portion and the second housing portion mate and form an enclosure therein; a tongue formed on an end of the first housing portion opposite the hinge; a groove formed on an end of the second housing portion opposing the hinge, the groove comprising two portions spaced apart to receive the tongue; a first hole extending through the tongue, a second hole extending through a first portion of the two portions of the groove and a third hole extending through a second portion of the two portions of the groove, wherein the first hole, the second hole, and the third hole are axially aligned when the first housing portion and the second housing portion are mated; and an illumination source powered by a power source and controlled by a switch, the illumination source, the power source, and the switch are disposed within the enclosure.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
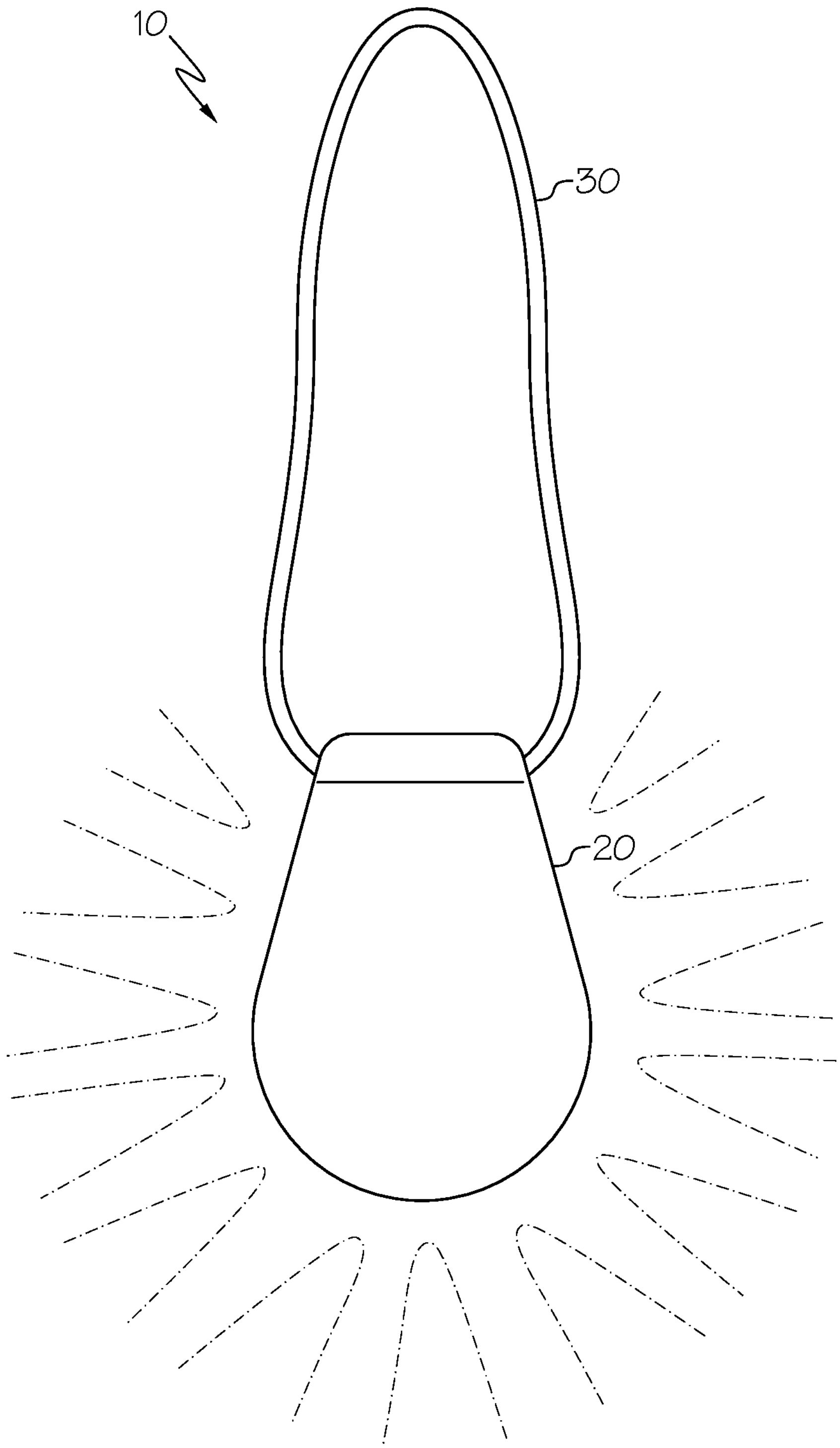
FIG. 1 depicts an illustrative embodiment of an illumination device, according to one or more embodiments shown and described herein.

References will now be made in detail to the embodiments of the disclosure, examples of which are illustrated in the accompanying drawings. Whenever possible, like reference numbers will be used to refer to like components or parts.

Embodiments described herein are directed to illumination devices. The illumination devices include wearable illumination devices that are capable of being connected to, for example, a pull or slider of a zipper. The illumination device can provide a variety of colored light, a single colored light, or a white light for illuminating an area around the illumination device. Aspects of the illumination devices, uses for the illumination devices, and modes of operation of the illuminations devices will be described in detail herein.

The illumination devices described herein provide several functions such as providing an aesthetically pleasing illuminating feature to the zipper on a bag, a coat, or the like. More specifically, the illuminations devices are configured to connect to a zipper pull or directly to the slider of the zipper absent the pull thereby providing illumination to the area around the zipper while also providing assistance with moving the zipper slider. They may connect to the zipper slider or pull by way of a string that may be fed through the pull or slide and lopped around the illumination portion of the illumination device. Such a knot allows the device to be readily attached and selectively removed without much effort.

The illumination device may be turned on and off by squeezing the illumination portion of the device which activates a button with in the illumination portion. The illumination device may have multiple illumination modes, including but not limited to a range of brightness, a range of colors, an ability to morph or transition from one color to another, flash or strobe at different frequencies, or the like. The desired illumination mode may be selected by a predefined sequence of activations of the button.

The illumination source of the illumination device is housed in soft durable transparent or semi-transparent material (e.g., such that greater than 50% of light passes through the material) such as a silicone, rubber-like, or malleable plastic material. The illumination device may be weather resistant (e.g., IP65).

Aspects of the illumination devices disclosed herein provide improved operability and illumination. As described in more detail herein the housing of the illumination device is formed by a soft and durable material that provide a user friendly grip and resiliency to impacts and wear and tear through use. Since the illumination devices described herein are coupled to object such as zippers on bags, jackets, tents, and the like, they are subject to outdoor environments and heavy use. Additionally, to facilitate a secure enclosure of the illumination source and power source within the housing but also enabling easy access inside the housing to replace the power source as needed, embodiments of the illumination devices described herein implement a hinged housing on one end and utilize the coupling portion on the opposing end to securely close the housing during use. The following will now describe embodiments of illumination devices in detail with reference to the figures.

FIG. 1 depicts an illustrative embodiment of an illumination device 10. The illumination device 10 includes two main portions. A first portion 20, also referred to herein as the illumination portion, and a second portion 30, also referred to herein as the coupling portion. The first portion 20 includes an illumination source and structural elements for housing the illumination source. The second portion 30 includes a rope string, a wire, an elastic string, or other similar material that forms a loop with the first portion that is connected to a portion of the loop.

Figure 2:
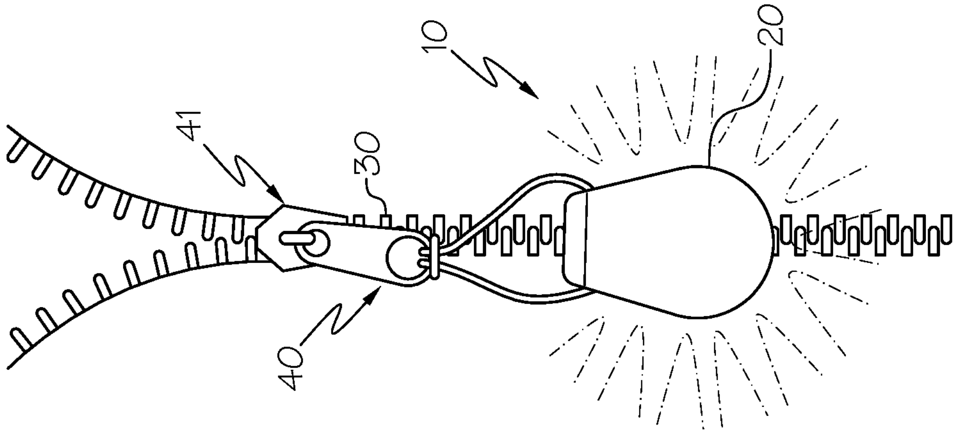
FIG. 2 depicts an illustrative embodiment of the illumination device connected to a zipper pull, according to one or more embodiments shown and described herein.

FIG. 2 depicts an illustrative embodiment of the illumination device connected to a zipper pull 40. The zipper pull 40 may be any zipper, for example, including but not limited to a zipper of a bag, jacket, tent, and the like. As depicted in the illustrative example, the second portion 30 of the illumination device 10, which may be a string, cord, wire, or the like, is fed through a hole in the zipper pull 40 or a slide 41 and looped around the first portion 20 to connect the illumination device 10 to the zipper. Other embodiments of a second portion 30 may be implemented such as a loop of string, wire, cord or the like that includes a clasp or other device that enables the loop to be opened and connected to the zipper pull 40 or slide 41.

Figure 3A:
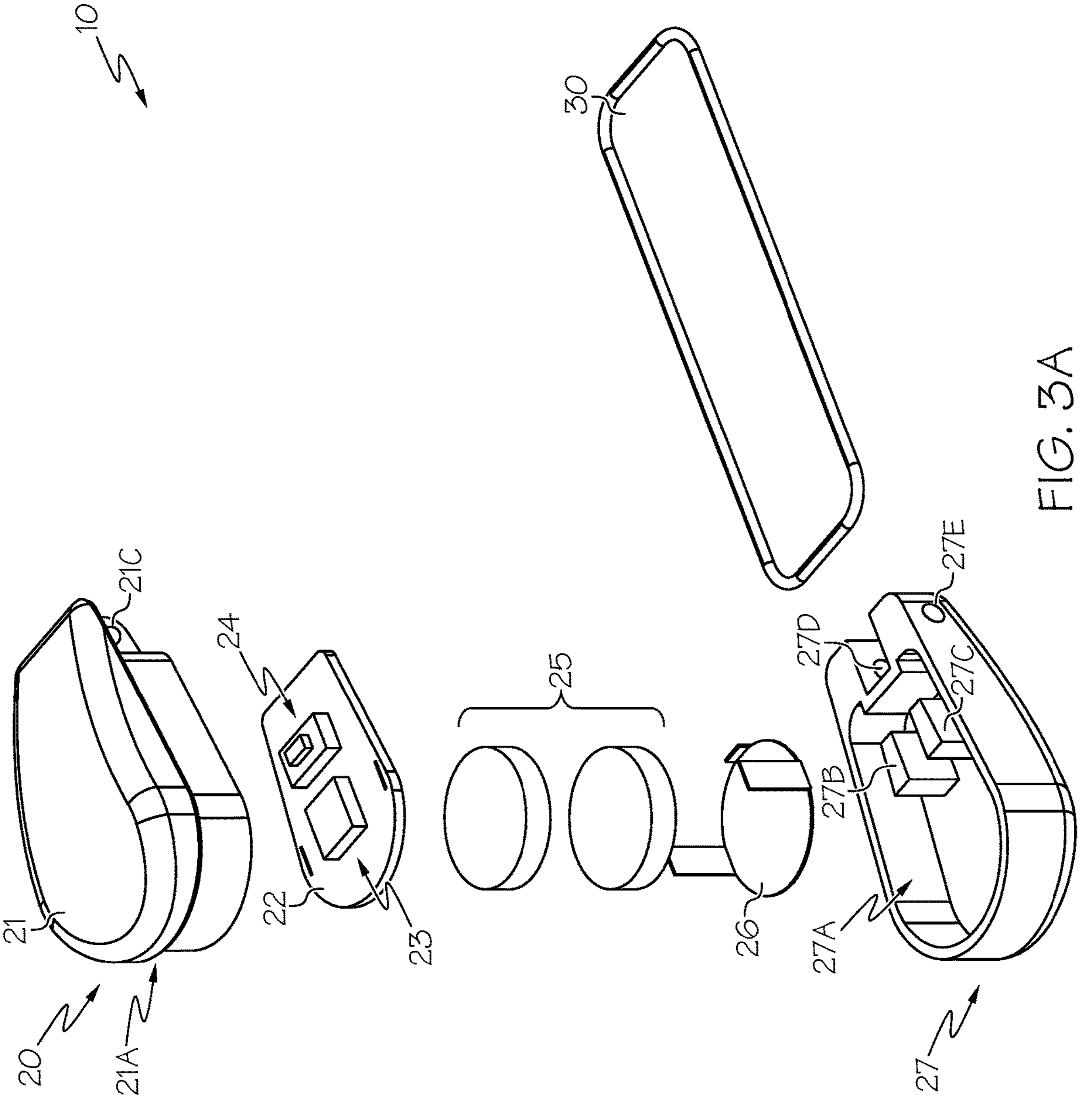
FIG. 3A depicts partially assembled view of the illumination device depicted in FIG. 3A, according to one or more embodiments shown and described herein.
Figure 3B:
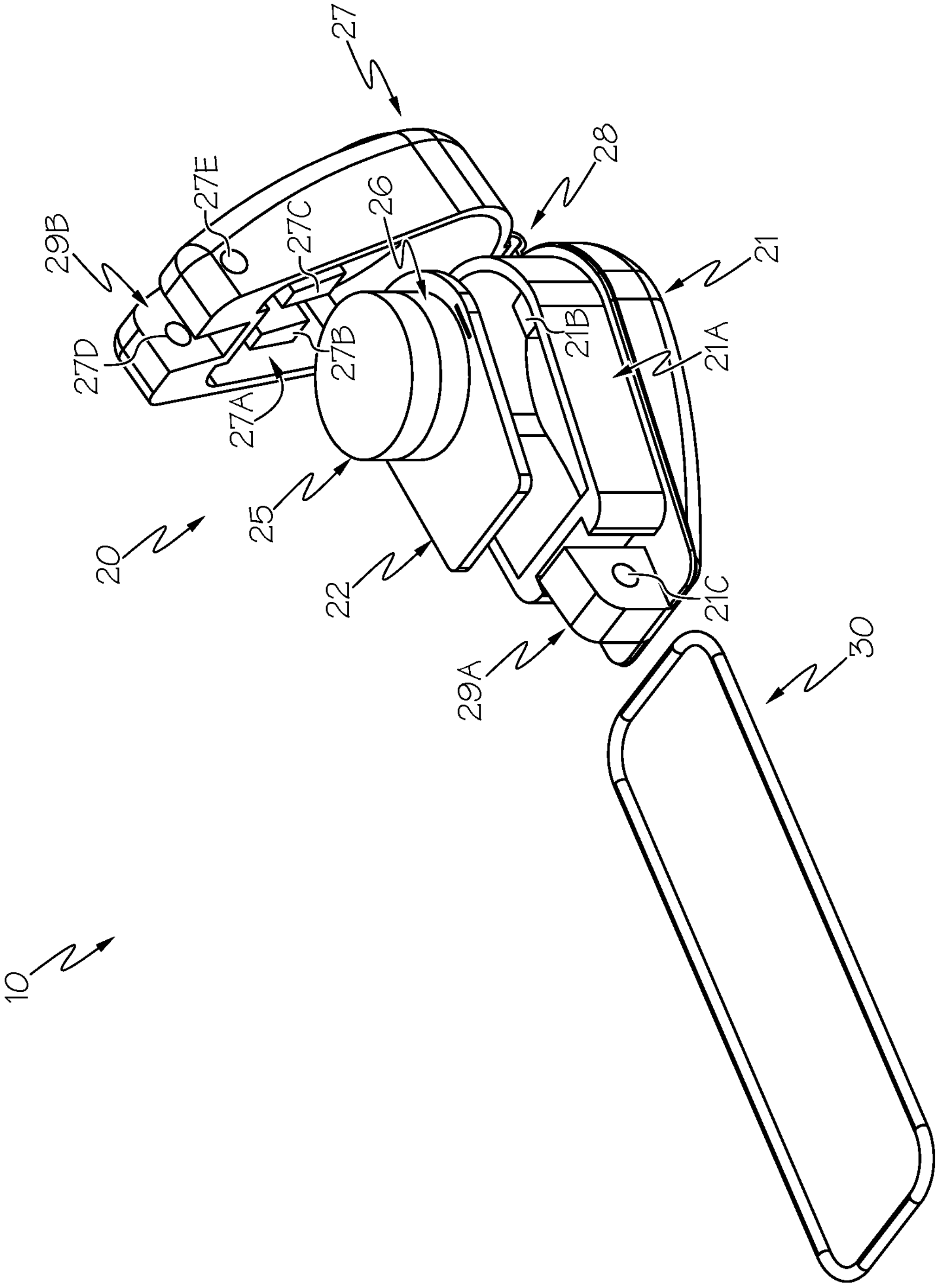
FIG. 3B depicts an exploded view of another illumination device, according to one or more embodiments shown and described herein.

Turning to FIGS. 3A and 3B exploded views of the illumination device 10 are depicted. Components depicted in the two illustrative examples are the same, with the exception of a hinge 28 which may be formed to couple the top housing portion 21 and the bottom housing portion 27 of the illumination portion 20. The hinge 28 will be described in more detail herein.

Referring to FIG. 3A, the illumination portion 20 of the illumination device 10 includes a two part housing (e.g., top housing portion 21 and the bottom housing portion 27). These two portions are configured to coupled together by way of an interference fit, where for example, the top housing portion 21 includes a flange 21A, optionally having one or more interference features that are received by a channel 27A formed by the inner wall of the bottom housing portion 27. The top housing portion 21 and the bottom housing portion 27 may be made of silicone or another material which includes a texture that causes friction (e.g., an interference) when the aforementioned features are brought into contact with each other. However, in some embodiments, structural features extending from the flange 21A and/or the channel 27A may be included to further strengthen the interference fit between the top housing portion 21 and the bottom housing portion 27.

The top housing portion 21 and the bottom housing portion 27 are made of transparent or semi-transparent so that light provided by the illumination source 23 may be channeled through the housing. The transparent or semi-transparent nature of the housing material also operates as a light pipe that channels light from the illumination source 23 throughout the body of the housing. The top housing portion 21 and the bottom housing portion 27 may include a diffusing texture which further enables the light from the illumination source 23 to be spread out or scattered giving a softer more even field of illumination as opposed to light directly projected from a bare illumination source 23.

The soft or pliable nature of the top and bottom housing portions 21 and 27 enables the switch 24 located between the top housing portion 21 and the bottom housing portion 27 to be activated by squeezing the housing portions together.

When the top housing portion 21 and the bottom housing portion 27 are mated together, an enclosure is formed. The enclosure includes top standoffs 21B (FIG. 3B) formed with the top housing portion 21 and bottom standoffs 27B and 27C formed with the bottom housing portion 27. The top standoffs 21B and bottom standoffs 27B and 27C are formed with the housing portions. As such, they comprise the soft pliable material (e.g., silicone, rubber-like material) of the housing which supports, locates and secures the electronics, power source(s), and illumination source(s) within the enclosure of the illumination device 10. The illumination device 10 includes a circuit board assembly 22. The circuit board assembly is a printed circuit board electrically and mechanically coupling one or more illumination sources 23, the switch 24 and the power source 25 together. The circuit board assembly 22 includes a plurality of electrical components configured to provide power from the power source 25 to the one or more illumination sources 23 in response to activation of the switch 24. The power source 25 may be a primary or secondary battery. For example, the power source 25 may be one or more coin cell batteries (e.g., CR1220) electrically connected together and mechanically attached to the printed circuit board through a conductive battery holder 26.

The secondary battery may be a lithium polymer or the like. The power source 25 may have a capacity capable of generating 24 hours of run time. In some embodiments, the illumination portion 20 may include a charging port (not shown) for charging a secondary battery. The charging port may be electrically and mechanically coupled to the circuit board assembly 22. The charging port may be a mini-USB, a micro-USB, or a USB-C type port. The charging port enables the power source 25 to be charged from an external power source.

The switch 24 may be a push button whereby sequential operation of the push button causes the one or more illumination sources 23 to output light at a corresponding power level, cycle through one or more colors, flash or strobe, or deactivate. For example, a first press of the button causes the one or more illumination sources 23 to provide light and a second press of the button causes the one or more illumination sources 23 to turn off. The one or more illumination sources 23 may be configured to morph through a predefined sequence of colors or remain illuminated on one color. As used herein, the term morph refers to a gradual transition over time from one color and/or brightness to another color and/or brightness. The one or more illumination sources 23 include white light emitting diodes (LEDs) and/or RGBW LEDs.

Various other sequences of switch 24 activations may cause the one or more illumination sources 23 to operate in a different way such as with respect to brightness, color, flash frequency, or the like. For example, in some embodiments, a first press of the button causes the one or more illumination sources 23 to provide light in at a brightness level where the color of the light cycles through a number of different colors. A second press of the button causes the one or more illumination sources 23 to hold illumination at the color that is provided when the button is pressed a second time. A third press of the button may cause the one or more illumination sources 23 to deactivate (e.g., 0% power level). In yet other embodiments, pressing the button (e.g., activating the switch 24) a predetermined number of time causes the light to cycle from a steady state to a flashing or strobing state. It should be understood that the order of button presses described here are not limited to only these examples. Other combinations and functions may be implemented. Furthermore, in some embodiments, depressing and holding the button for a predefined period of time causes the illumination device 10 to change operating modes, such as flashing to steady, one to off, a first color to a second color, or the like.

Modes of illumination may include high brightness, medium brightness, low brightness, and/or a flashing mode. The brightness may change my change the power delivered to the light illuminating devices. For example, the light emitting devices may provide 5 lumens, 10 lumens, 15 lumens, 20 lumens, or any level between 5 and 100 lumens. Each brightness mode may be configured to provide a different lumen level. Modes of illumination may also include changing the color of the light emitted. In some embodiments, the one or more illumination sources 23 may be configured cycle or morph from a first color to a second color.

Figure 4:
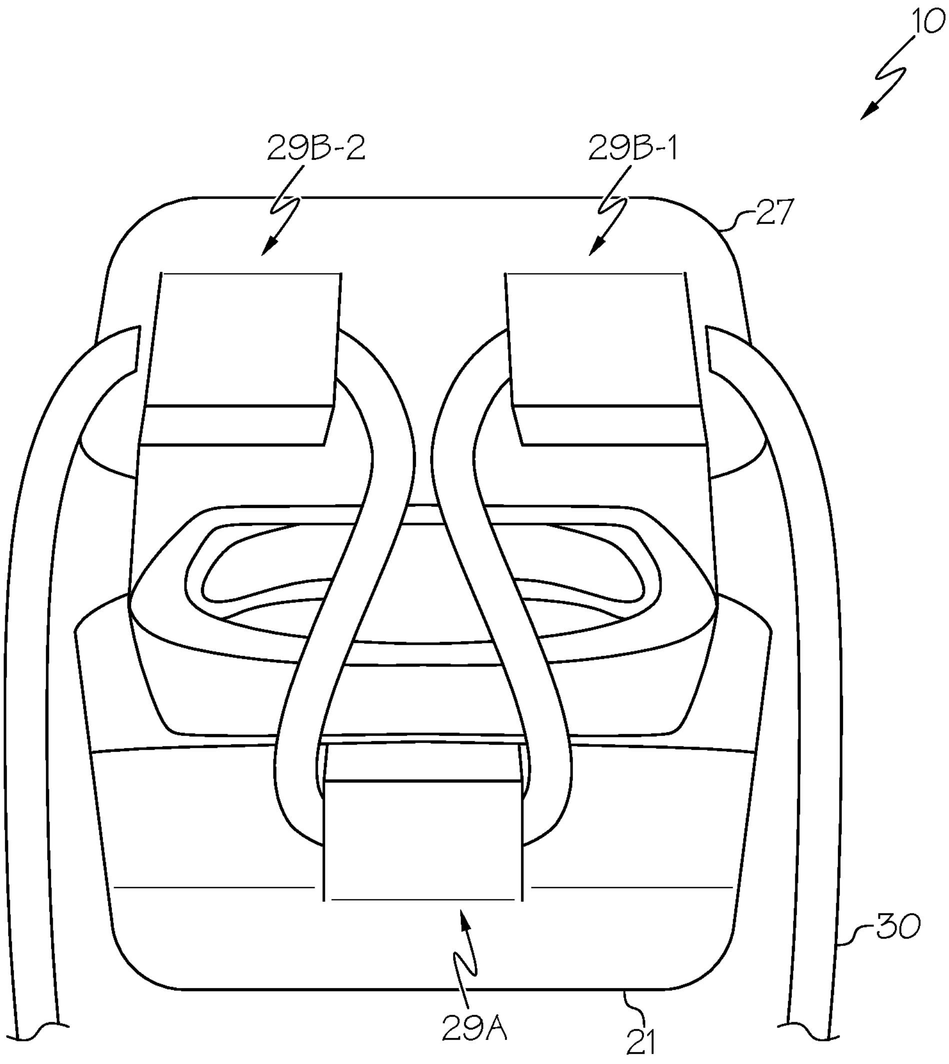
FIG. 4 depicts an end view of a partially assembled illumination device, according to one or more embodiments shown and described herein.

Turning to FIG. 3B, a partially assembled view of the illumination device shown in FIG. 3A is shown. As shown in FIG. 3B, the top housing portion 21 and the bottom housing portion 27 are connected at a first end to each other through a hinge 28. The hinge 28 may be formed with the top housing portion 21 and the bottom housing portion 27 or may be a separate component connecting the top housing portion 21 and the bottom housing portion 27. Additionally, on the end opposite the hinge 28, referred to herein as the second end, interleaved mating portions of the top housing portion 21 and the bottom housing portion 27 are formed. The interleaved mating portion defined as a tongue (e.g., 29A, FIGS. 3A and 3B) and groove (e.g., 29B, FIGS. 3A and 3B) are shown. The tongue 29A is formed as part of the top housing portion 21 having a height, a width, and a depth configured to be received within the groove 29B formed as part of the bottom housing portion 27. The tongue 29A includes a hole 21C extending through the width of the tongue 29. The two portions 29B-1 and 29B-2 (shown in FIG. 4) each comprise a hole 27D and 27E, respectively, extending there through. The aforementioned holes 21C, 27D, and 27E align with each other when the tongue 29A is positioned within the groove 29B thereby mating the top housing portion 21 and the bottom housing portion 27. The second portion 30 comprising string, wire, cord or the like extends through the holes 21C, 27D, and 27E. When the top housing portion 21 and the bottom housing portion 27 are mated together thereby forming an assembled illumination portion 20 the second portion 30 functions to keep the top housing portion 21 and the bottom housing portion 27 in a mated configuration as the second portion 30 extends through the holes 21C, 27D, and 27E. Since the second portion 30 comprises a flexible and string-like material, a user can open the illumination portion 20 by allowing slack of the second portion 30 to run through the holes 21C, 27D, and 27E as the top housing portion 21 and the bottom housing portion 27 are separated. FIG. 4 illustrates how the second portion 30 extends through the tongue 29A and the groove 29B of the top housing portion 21 and the bottom housing portion 27. Additionally, as shown in FIG. 4, the illumination portion 20 is depicted in a partially open state, such as a state resembling a user opening the illumination portion 20 to change replace the power source or clean the device, or in a partially closed state, such as a state resembling reassembling the illumination portion 20 prior to use.

Figure 5:
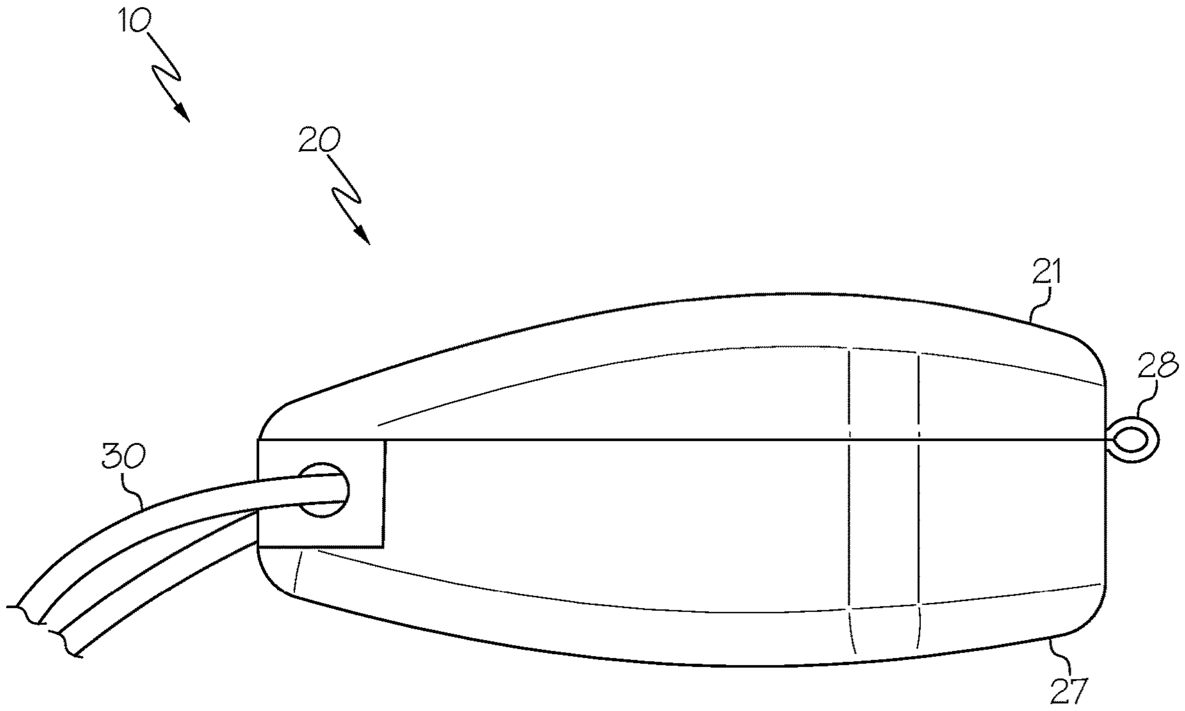
FIG. 5 depicts an side view of a fully assembled illumination device, according to one or more embodiments shown and described herein.

FIG. 5 illustrates a side view of the illumination device 10 in a full closed and assembled state with reference made to components and features described herein.

Figure 6:
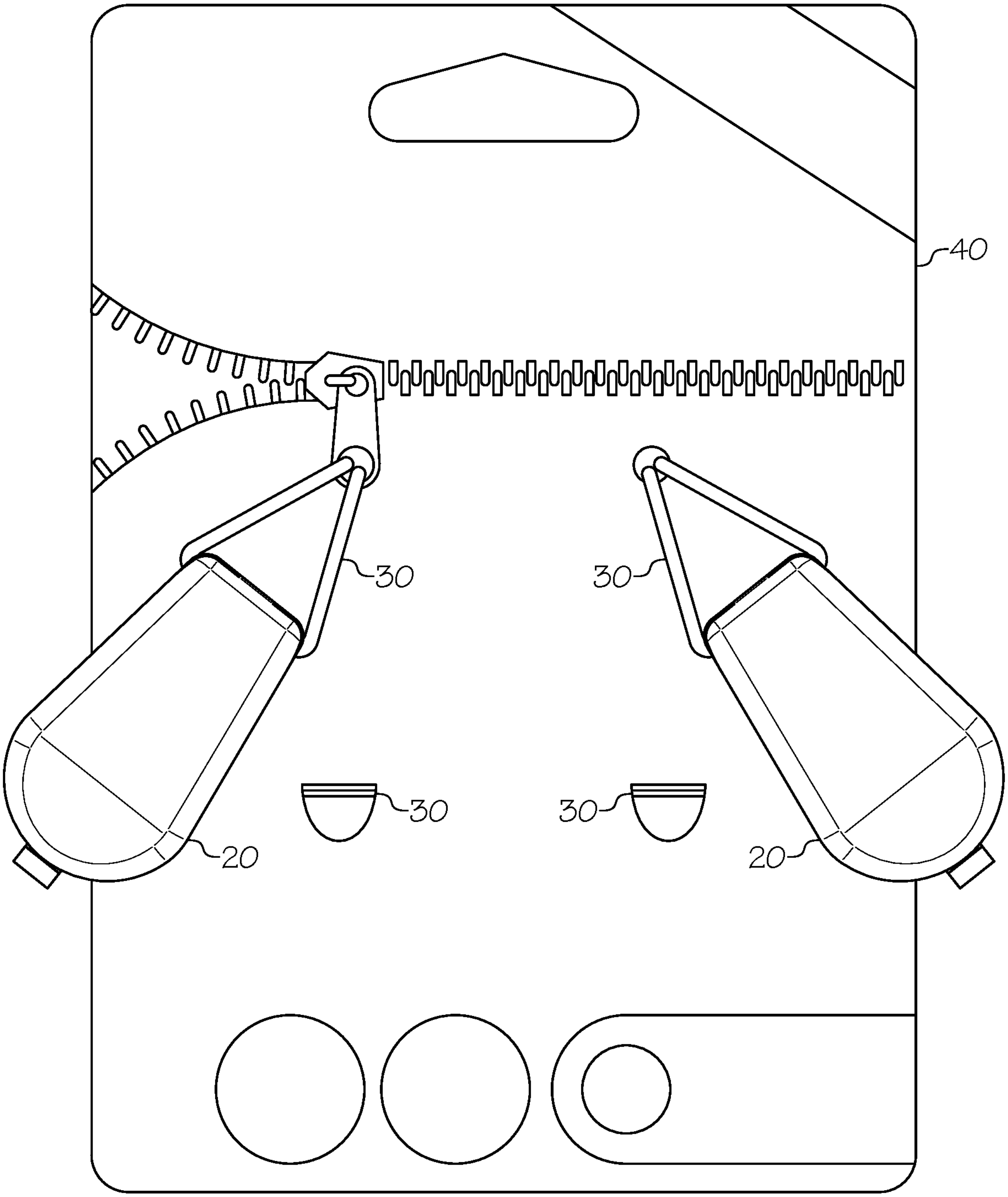
FIG. 6 depicts an illustrative example of another package for the illumination device, according to one or more embodiments shown and described herein.

Referring now to FIG. 6, an illustrative example of a package for the illumination device The packaging may be two ply card stock where the string (e.g., the second portion 30) of the illumination device 10 is looped around a portion of the top ply of the two ply card stock via a first hole (e.g., locally aligned with the illustration of the zipper pull graphic and out through a U-shaped slit that is located behind the illumination portion 20 when free hanging from the packaging. It is noted that the illumination portion 20 of the two illustrated products are rotated outward so that the U-shaped slit is visible. The second portion 30 is looped around the U-shaped slit thereby securing the product (e.g., the illumination device 10) to the packaging. The illustrated packaging provides an illustration to a potential customer of the potential use for the product, for example as an extension and illumination device for a zipper pull. This illustrates the way the product may be used so that the customer may readily conceptualize the functionality of the attachment means of the illumination device.

Implementation examples are described in the following numbered clauses:

Clause 1: An illumination device comprising an illumination portion comprising: a first housing portion connected a second housing portion by a hinge at a first end, wherein when folded about the hinge the first housing portion and the second housing portion mate and form an enclosure therein; a tongue formed on an end of the first housing portion opposite the hinge; a groove formed on an end of the second housing portion opposing the hinge, the groove comprising two portions spaced apart to receive the tongue; a first hole extending through the tongue, a second hole extending through a first portion of the two portions of the groove and a third hole extending through a second portion of the two portions of the groove, wherein the first hole, the second hole, and the third hole are axially aligned when the first housing portion and the second housing portion are mated; a coupling portion comprising a flexible string-like material extends through each of the first hole, the second hole, and the third hole; and an illumination source powered by a power source and controlled by a switch, the illumination source, the power source, and the switch are disposed within the enclosure, wherein the switch is actuatable by compressing the first housing portion and the second housing portion.

Clause 2: The illumination device of Clauses 1, wherein the illumination portion comprises a soft pliable material.

Clause 3: The illumination device of Clauses 2, wherein the soft pliable material is silicone or a rubber-like material.

Clause 4: The illumination device of any preceding Clauses 1-3, wherein the illumination portion comprises a material that is semi-transparent.

Clause 5: The illumination device of Clause 4, wherein the material transmits at least 50% of light there the material.

Clause 6: The illumination device of any preceding Clauses 1-5, wherein the illumination source is one or more light emitting diodes.

Clause 7: The illumination device of any preceding Clauses 1-6, wherein the illumination source is one or more multi-color light emitting diodes and the illumination source is configured to morph between one or more colors when activated to an ON state by the switch.

Clause 8: The illumination device of any preceding Clauses 1-7, wherein the illumination source is one or more multi-color light emitting diodes and the illumination source is configured to morph between one or more colors when activated to an ON state by the switch.

Clause 9: The illumination device of any preceding Clauses 1-8, wherein the coupling portion is a loop of at least one of a string, a wire, or a cord.

Clause 10: The illumination device of any preceding Clauses 1-9, wherein the coupling portion comprises a clasp for selectively opening and closing a loop defining the coupling portion.

Clause 11: The illumination device of any preceding Clauses 1-10, wherein the coupling portion is configured to couple to a zipper pull or slider.

Clause 12: The illumination device of any preceding Clauses 1-11, wherein the hinge, the first housing portion, and the second housing portion are formed as a contiguous piece.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents.

What is claimed is:

1. An illumination device comprising:

an illumination portion comprising:

a first housing portion connected a second housing portion by a hinge at a first end, wherein when folded about the hinge the first housing portion and the second housing portion mate and form an enclosure therein;

a tongue formed on an end of the first housing portion opposite the hinge;

a groove formed on an end of the second housing portion opposing the hinge, the groove comprising two portions spaced apart to receive the tongue;

a first hole extending through the tongue, a second hole extending through a first portion of the two portions of the groove and a third hole extending through a second portion of the two portions of the groove, wherein the first hole, the second hole, and the third hole are axially aligned when the first housing portion and the second housing portion are mated;

a coupling portion comprising a flexible string-like material extends through each of the first hole, the second hole, and the third hole; and an illumination source powered by a power source and controlled by a switch, the illumination source, the power source, and the switch are disposed within the enclosure, wherein the switch is actuatable by compressing the first housing portion and the second housing portion.

2. The illumination device of claim 1, wherein the illumination portion comprises a soft pliable material.

3. The illumination device of claim 2, wherein the soft pliable material is silicone or a rubberlike material.

4. The illumination device of claim 1, wherein the illumination portion comprises a material that is semi-transparent.

5. The illumination device of claim 4, wherein the material transmits at least 50% of light there the material.

6. The illumination device of claim 1, wherein the illumination source is one or more light emitting diodes.

7. The illumination device of claim 1, wherein the illumination source is one or more multicolor light emitting diodes and the illumination source is configured to morph between one or more colors when activated to an ON state by the switch.

8. The illumination device of claim 1, wherein the illumination source is configured to output light at a corresponding power level, cycle through a predefined sequence of colors, flash, or strobe, in response to sequential operation of the switch.

9. The illumination device of claim 1, wherein the coupling portion is a loop of at least one of a string, a wire, or a cord.

10. The illumination device of claim 1, wherein the coupling portion comprises a clasp for selectively opening and closing a loop defining the coupling portion.

11. The illumination device of claim 1, wherein the coupling portion is configured to couple to a zipper pull or slider.

12. The illumination device of claim 1, wherein the hinge, the first housing portion, and the second housing portion are formed as a contiguous piece.

13. An illumination device comprising an illumination portion comprising:

a first housing portion connected a second housing portion by a hinge at a first end, wherein when folded about the hinge the first housing portion and the second housing portion mate and form an enclosure therein;

a tongue formed on an end of the first housing portion opposite the hinge;

a groove formed on an end of the second housing portion opposing the hinge, the groove comprising two portions spaced apart to receive the tongue;

a first hole extending through the tongue, a second hole extending through a first portion of the two portions of the groove and a third hole extending through a second portion of the two portions of the groove, wherein the first hole, the second hole, and the third hole are axially aligned when the first housing portion and the second housing portion are mated; and an illumination source powered by a power source and controlled by a switch, the illumination source, the power source, and the switch are disposed within the enclosure.

14. The illumination device of claim 13, wherein the illumination portion comprises a soft pliable material.

15. The illumination device of claim 14, wherein the soft pliable material is silicone or a rubber-like material.

16. The illumination device of claim 13, wherein the illumination portion comprises a material that is semi-transparent.

17. The illumination device of claim 13, wherein the illumination source is one or more light emitting diodes.

18. The illumination device of claim 13, wherein the illumination source is one or more multi-color light emitting diodes and the illumination source is configured to morph between one or more colors when activated to an ON state by the switch.

19. The illumination device of claim 13, wherein the illumination source is configured to output light at a corresponding power level, cycle through a predefined sequence of colors, flash, or strobe, in response to sequential operation of the switch.

20. The illumination device of claim 13, wherein the hinge, the first housing portion, and the second housing portion are formed as a contiguous piece.

* * * * *